United States Patent
Kato et al.

(10) Patent No.: US 12,272,989 B2
(45) Date of Patent: Apr. 8, 2025

(54) BACKUP POWER SUPPLY APPARATUS AND BACKUP POWER SUPPLY APPARATUS CONTROLLING METHOD

(71) Applicant: FDK CORPORATION, Tokyo (JP)

(72) Inventors: Masato Kato, Tokyo (JP); Naoaki Konda, Tokyo (JP)

(73) Assignee: FDK CORPORATION, Tokyo (JP)

( * ) Notice: Subject to any disclaimer, the term of this patent is extended or adjusted under 35 U.S.C. 154(b) by 40 days.

(21) Appl. No.: 18/187,756

(22) Filed: Mar. 22, 2023

(65) Prior Publication Data
US 2023/0307943 A1 Sep. 28, 2023

(30) Foreign Application Priority Data

Mar. 24, 2022 (JP) ................................ 2022-048544

(51) Int. Cl.
*H02J 9/06* (2006.01)

(52) U.S. Cl.
CPC .............. *H02J 9/061* (2013.01); *H02J 9/068* (2020.01)

(58) Field of Classification Search
CPC ........ H02J 9/061; H02J 9/068; H02J 2207/20; H02J 7/0063; H02J 7/007182
See application file for complete search history.

(56) References Cited

U.S. PATENT DOCUMENTS

| | | | |
|---|---|---|---|
| 4,779,037 A | 10/1988 | Locascio | |
| 2013/0249526 A1 | 9/2013 | Lee | |
| 2014/0333137 A1* | 11/2014 | Lin | H02J 9/061 |
| | | | 307/66 |
| 2017/0179760 A1* | 6/2017 | Jawany | H02J 9/061 |

FOREIGN PATENT DOCUMENTS

JP 2004-129350 A 4/2004

OTHER PUBLICATIONS

European Extended Search Report from EP Application No. 23162939.5 mailed Aug. 30, 2023, 7 pages.

\* cited by examiner

*Primary Examiner* — Lincoln D Donovan
*Assistant Examiner* — Alex W Lam
(74) *Attorney, Agent, or Firm* — Shih IP Law Group, PLLC

(57) ABSTRACT

The backup power supply apparatus is an apparatus that supplies power to a power-supply target apparatus operating by power supply from an external power source when a power supply state of the external power source is emergency. The backup power supply apparatus includes: a power storage section; a series regulator that is located on a line connecting the power storage section and the power-supply target apparatus; and control circuitry that changes an output voltage of the series regulator in multiple stages in accordance with a change in the power supply state of the external power source and a change in a voltage of the power storage section.

7 Claims, 5 Drawing Sheets

BACKUP POWER SUPPLY APPARATUS AND BACKUP POWER SUPPLY APPARATUS CONTROLLING METHOD

CROSS REFERENCE TO RELATED APPLICATIONS

This application is entitled to or claims the benefit of Japanese Patent Application No. 2022-048544, filed on Mar. 24, 2022, the disclosure of which including the specification, drawings and abstract is incorporated herein by reference in its entirety.

TECHNICAL FIELD

The present disclosure relates to a backup power supply apparatus and a backup power supply apparatus controlling method.

BACKGROUND ART

A backup power supply apparatus with a storage battery is sometimes connected to a power-supply target apparatus in case of emergency that disables power supply from an external power source to the power-supply target apparatus, such as a power outage. The backup power supply apparatus supplies power to the power-supply target apparatus instead of the external power source in the case of a power outage, for example.

As a conventional power supply apparatus with a power storage section including a storage battery, an apparatus not directly outputting the voltage of the power storage section to a power-supply target apparatus has been widely known. In the power supply apparatus disclosed in Patent Literature 1, for example, a regulator generates a target voltage by boosting or stepping down the battery voltage.

In the case of a backup power supply apparatus, the voltage of a power storage section (hereinafter, referred to as "power storage voltage") is stepped down to lower than the voltage of an external power source (hereinafter, referred to as "power source voltage" to distinguish it from the power storage voltage) in the case of non-power outage, for example. In this manner, the voltage outputted from the backup power supply apparatus (output voltage) is kept lower than the power source voltage in the case of non-power outage, and the frequency of the use of the storage battery is reduced in the case of non-power outage, thereby preventing deterioration of the storage battery.

CITATION LIST

Patent Literature

PTL 1
Japanese Patent Application Laid-Open No. 2004-129350

SUMMARY OF INVENTION

Technical Problem

The backup power supply apparatus is sometimes mounted with a power storage section with enlarged capacity by being provided with a large number of storage batteries, for example, and such a case increases the power storage voltage in general. The increase of the power storage voltage expands the difference from the power source voltage and increases the voltage difference before and after the step-down (step-down amount) that is necessary in the case of non-power outage, in some cases. Providing a large number of elements (e.g., diodes) for the step-down, for example, to increase the step-down amount of the power storage voltage, however, significantly increases the number of components of the backup power supply apparatus and increases the size of the apparatus and the power loss, which is not preferable.

In addition, when the power storage voltage increases, the difference between the power storage voltage and the rated voltage of the power-supply target apparatus also increases. As a result, the step-down amount necessary in the case of power outage, that is, the step-down amount from the power storage voltage to the rated voltage increases in some cases.

It is thus required to adaptively step down the power storage voltage to the output voltage according to the changing circumstances.

It is an object of the present disclosure to provide a backup power supply apparatus and a backup power supply apparatus controlling method each capable of adaptively stepping down the power storage voltage while preventing a significant increase in the number of components.

Solution to Problem

A backup power supply apparatus of the present disclosure is a backup power supply apparatus that supplies power to a power-supply target apparatus when a power supply state of an external power source is emergency, the power-supply target apparatus being an apparatus that operates by power supply from the external power source, the backup power supply apparatus comprising: a power storage section; a series regulator that is located on a line connecting the power storage section and the power-supply target apparatus; and control circuitry that changes an output voltage of the series regulator in multiple stages in accordance with a change in the power supply state of the external power source and a change in a voltage of the power storage section.

A backup power supply apparatus controlling method of the present disclosure is a method of controlling a backup power supply apparatus that supplies power to a power-supply target apparatus when a power supply state of an external power source is emergency, the power-supply target apparatus being an apparatus that operates by power supply from the external power source, the method comprising: changing an output voltage of a series regulator in multiple stages in accordance with a change in the power supply state of the external power source and a change in a voltage of a power storage section, the series regulator being located on a line that connects the power storage section and the power-supply target apparatus.

Advantageous Effects of Invention

The present disclosure makes it possible to provide a backup power supply apparatus and a backup power supply apparatus controlling method each capable of adaptively stepping down the power storage voltage while preventing a significant increase in the number of components.

DESCRIPTION OF EMBODIMENTS

Hereinafter, a backup power supply apparatus according to an embodiment of the present disclosure will be described in detail with reference to the accompanying drawings.
(Circuitry Configuration)

Figure 1:
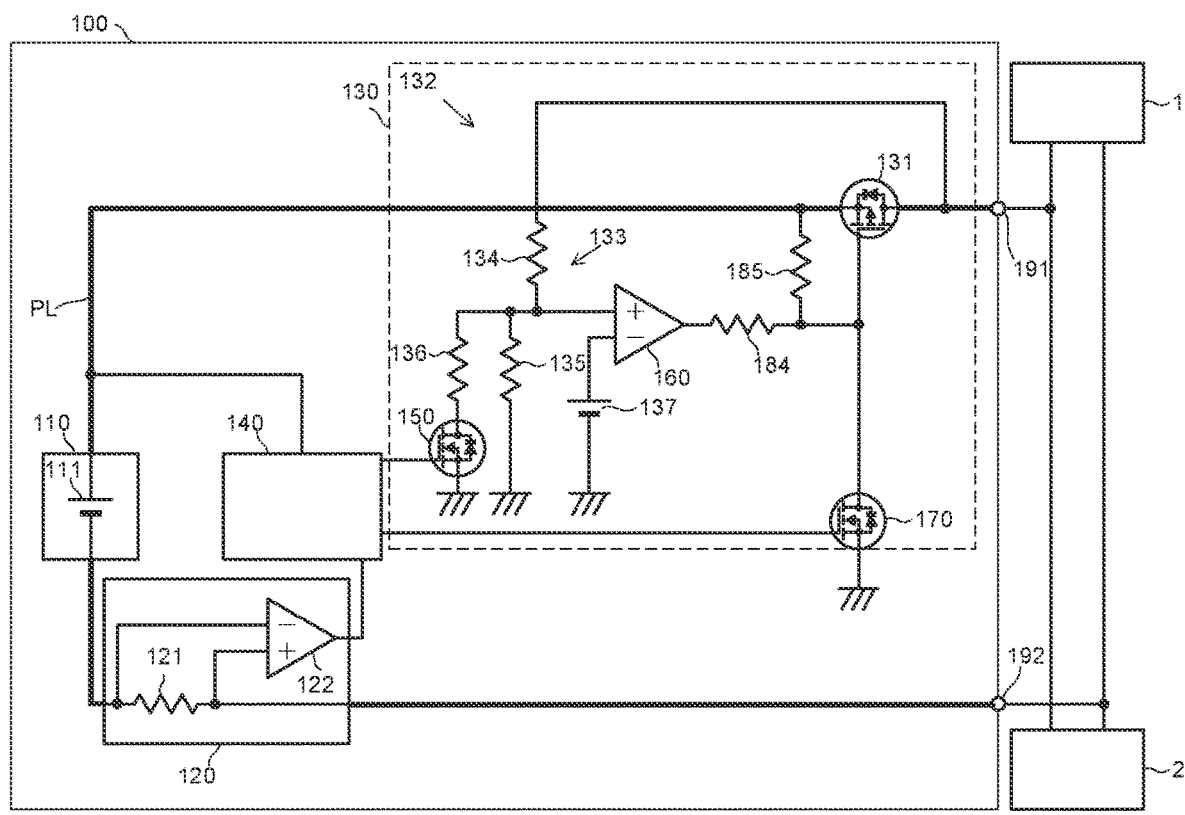
FIG. 1 is a circuit diagram illustrating a backup power supply apparatus according to an embodiment.

FIG. 1 is a circuit diagram illustrating backup power supply apparatus 100 according to an embodiment. Backup power supply apparatus 100 is electrically connected to external power source 1 and power-supply target apparatus 2 via input/output terminals 191 and 192. External power source 1 is, for example, an apparatus that converts commercial AC power into DC power and outputs the DC power. External power source 1 supplies power to power-supply target apparatus 2. Power-supply target apparatus 2 is an apparatus that operates by receiving the power supply. Power-supply target apparatus 2 may be, for example, a server apparatus.

Backup power supply apparatus 100 is a power supply apparatus that supplies power to power-supply target apparatus 2 in case of a power supply emergency, typically in case of a power outage, of external power source 1.

Backup power supply apparatus 100 includes power storage section 110, series regulator 130, and control circuitry 140. Control circuitry 140 controls the output voltage of series regulator 130 in multiple stages based on the voltage of power storage section 110 and the change in the power supply state of external power source 1.

Power storage section 110 is connected to input/output terminals 191 and 192 via power supply line PL. Power supply line PL is a supply line for supplying power stored in power storage section 110 to power-supply target apparatus 2.

Power storage section 110 includes storage battery 111. In the present embodiment, power storage section 110 includes single storage battery 111 as illustrated in FIG. 1. Thus, the power storage voltage is equivalent to the voltage of storage battery 111 in the present embodiment. Note that power storage section 110 may include a plurality of storage batteries 111. For example, power storage section 110 may include ten storage batteries 111 connected in series. In a case where power storage section 110 includes a plurality of storage batteries 111, the power storage voltage corresponds to a combined voltage of the plurality of storage batteries 111.

Storage battery 111 is, for example, a rechargeable battery such as a nickel metal hydride battery and a lithium-ion battery.

Backup power supply apparatus 100 includes current detection circuitry 120. Current detection circuitry 120 detects the output current of backup power supply apparatus 100 by measuring the current flowing through power supply line PL, and outputs the detected current to control circuitry 140.

Current detection circuitry 120 includes, for example, resistance element 121 and operational amplifier 122. Resistance element 121 is located on power supply line PL. When the voltage at both ends of resistance element 121 is respectively inputted to two input terminals of operational amplifier 122, operational amplifier 122 outputs a signal that is based on the voltage difference to control circuitry 140.

Series regulator 130 is located on power supply line PL, receives an input of the power storage voltage, and outputs a predetermined voltage as the output voltage under the control of control circuitry 140. In the present embodiment, the output voltage of series regulator 130 corresponds to the output voltage of backup power supply apparatus 100 since it is outputted to power-supply target apparatus 2.

Series regulator 130 includes drive element 131 and gate voltage adjustment circuitry 132.

Drive element 131 is a transistor. FIG. 1 illustrates drive element 131 being a p-type field effect transistor (FET). Drive element 131 is located on power supply line PL, and the output voltage changes according to on-resistance.

Gate voltage adjustment circuitry 132 changes the gate voltage of drive element 131 in multiple stages under the control of control circuitry 140. The change in the gate voltage changes the on-resistance of drive element 131.

Gate voltage adjustment circuitry 132 includes voltage divider 133, reference power supply 137, switching element 150, operational amplifier 160, and switching element 170.

Voltage divider 133 is circuitry that divides the output voltage fed back from the drain side of drive element 131 and inputs the divided output voltage to operational amplifier 160, and includes resistance elements 134 to 136.

Resistance element 134 is located on a feedback line from the drain side of drive element 131 to a non-inverting input terminal of operational amplifier 160. In the present embodiment, single resistance element 134 composes a first resistor section.

Resistance element 135 is connected in series with resistance element 134 and is connected to the non-inverting input terminal of operational amplifier 160 and the ground. Note that the intermediate portion of resistance element 134 and resistance element 135 is connected to the non-inverting terminal of operational amplifier 160.

Resistance element 136 is connected in parallel with resistance element 135. Resistance element 136 is connected to the ground via switching element 150, and is also connected to the non-inverting input terminal of operational amplifier 160. In the present embodiment, resistance element 135 and resistance element 136 compose a second resistor section.

Reference power supply 137 is a power supply that outputs a reference voltage for controlling the output voltage to an inverting input terminal of operational amplifier 160. The reference voltage is determined according to the rated voltage of power-supply target apparatus 2, the voltage of external power source 1, and the like.

In the present embodiment, switching element 150 is an n-type field effect transistor (FET) as illustrated in FIG. 1. Switching element 150 has its source connected to resistance element 136, its drain connected to the ground, and its gate connected to control circuitry 140. When a voltage is applied to the gate of switching element 150, switching element 150 changes from a non-conductive state to a conductive state due to the gate-drain voltage Vgd based on the applied voltage.

The switching of switching element 150 between the non-conductive state and the conductive state changes a combined resistance value between resistance element 135 and resistance element 136 (hereinafter, sometimes simply referred to as a "combined resistance value"). As the combined resistance value changes, the division ratio of voltage divider 133 changes. As a result, the voltage inputted to the non-inverting input terminal of operational amplifier 160 changes.

Operational amplifier 160 outputs a voltage based on a voltage difference between the voltages inputted to the inverting input terminal and the non-inverting input terminal. An output terminal of operational amplifier 160 is connected to the gate of drive element 131. Note that resistance element 184 may be located between the output terminal of operational amplifier 160 and the gate of drive element 131.

In the present embodiment, switching element 170 is an n-type field effect transistor as illustrated in FIG. 1. Switching element 170 has its source connected to the gate of drive element 131, its drain connected to the ground, and its gate connected to control circuitry 140. When a voltage is applied to the gate of switching element 170, switching element 170 changes from a non-conductive state to a conductive state due to the gate-drain voltage Vgd based on the applied voltage.

The switching of switching element 170 between the non-conductive state and the conductive state causes the gate of drive element 131 to switch between disconnecting and connecting to the ground. When the gate of drive element 131 is connected to the ground, the gate-source voltage Vgs of drive element 131 becomes extremely large, and consequently, the on-resistance of drive element 131 becomes extremely small.

Note that resistance element 185 may be located between the source and gate of drive element 131.

Control circuitry 140 determines a power supply state of external power source 1 based on the signal from current detection circuitry 120. Control circuitry 140 also detects the power storage voltage. Control circuitry 140 then switches switching elements 150 and 170 between the conductive state and the non-conductive state based on the change in the power supply state of external power source 1 and the power storage voltage.

(Output Voltage Control)

The output voltage control of backup power supply apparatus 100 will be described below. By way of example, it is assumed that power source voltage Vd is 12V, rated voltage Vs of power-supply target apparatus 2 is 14V, and maximum value VM of power storage voltage Vu when backup power supply apparatus 100 has a charge rate of 100% is 14.5V. Note that 12V as an exemplary power source voltage Vd is a fixed value based on the specification of external power source 1. Needless to say, in the event of a power outage, the voltage outputted from external power source 1 is almost 0V or significantly decreases from 12V.

Figure 2:
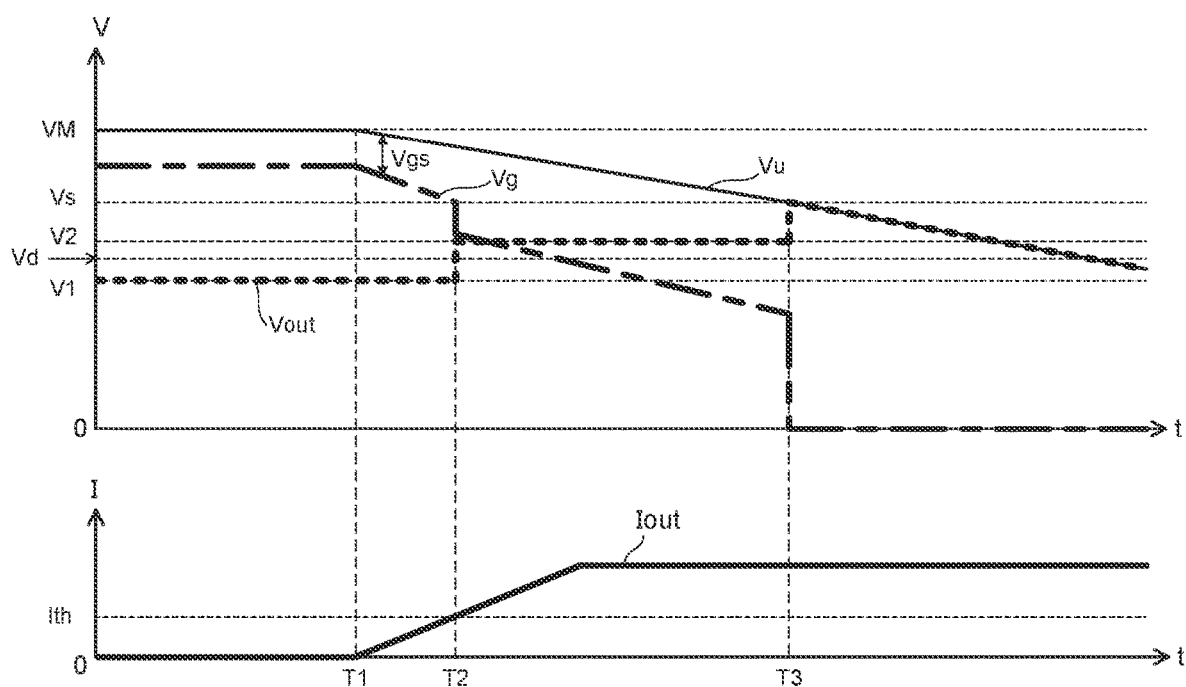
FIG. 2 is a timing chart describing exemplary voltage control by the backup power supply apparatus according to an embodiment.

FIG. 2 is a timing chart describing voltage control by backup power supply apparatus 100. The solid line indicates a change in power storage voltage Vu, the dashed-dotted line (thick line) indicates a change in gate voltage Vg of drive element 131, and the broken line (thick line) indicates a change in output voltage Vout.

In the normal state, that is, in the non-power outage state, external power source 1 supplies power to power-supply target apparatus 2 at power source voltage Vd. When backup power supply apparatus 100 has a charge rate of 100%, power storage voltage Vu is 14.5V (maximum value VM), which is higher than power source voltage Vd (12V). Thus, control circuitry 140 controls output voltage Vout to less than power source voltage Vd. Since output voltage Vout is less than power source voltage Vd, no current is outputted from backup power supply apparatus 100. That is, output current Iout is almost 0A in the case of non-power outage.

To be more specific, control circuitry 140, for example, places switching element 150 in the non-conductive state. A voltage based on the division ratio of voltage divider 133 and a reference voltage from reference power supply 137 are respectively inputted to the non-inverting input terminal and the inverting input terminal of the operational amplifier 160. Operational amplifier 160 outputs a voltage based on a difference between the voltage based on the division ratio of voltage divider 133 and the reference voltage. The output voltage of operational amplifier 160 is inputted to the gate of drive element 131 through resistance element 184. Incidentally, control circuitry 140 always places switching element 170 in the non-conductive state in the case of non-power outage. This is because no gate voltage is applied from operational amplifier 160 to drive element 131 when switching element 170 is in the conductive state.

This gate voltage controls the conductive state by drive element 131. In the exemplary output voltage control described here, output voltage Vout is controlled to constant voltage value V1 (e.g., 11V), which is below power source voltage Vd (see FIG. 2).

Then, when a power outage occurs in external power source 1 at time T1, the output voltage from external power source 1 becomes almost 0V or significantly decreases from 12V and becomes lower than output voltage Vout, so that output current Iout starts flowing through power supply line PL. Note that power storage voltage Vu starts decreasing from maximum value VM as output current Iout starts increasing. In addition, gate voltage Vg decreases as power storage voltage Vu decreases.

At time T2, output current Iout reaches threshold Ith, and control circuitry 140 determines that the power supply state of external power source 1 is an emergency state, that is, a power outage state. Threshold Ith is, for example, higher than 0A and less than the peak current value in supplying power from backup power supply apparatus 100 to power-supply target apparatus 2. At this time, in order to supply power from power storage section 110 to power-supply target apparatus 2, control circuitry 140 increases output voltage Vout to a level not exceeding rated voltage Vs.

To be more specific, control circuitry 140, for example, switches switching element 150 from the non-conductive state to the conductive state. The switching of switching element 150 from the non-conductive state to the conductive state changes a combined resistance value between resistance element 135 and resistance element 136. Accordingly, the division ratio in voltage divider 133 changes and the voltage inputted to the non-inverting input terminal of operational amplifier 160 changes. As a result, since the voltage outputted from operational amplifier 160 changes, gate voltage Vg of drive element 131 decreases stepwise.

As gate voltage Vg decreases, the conductive state of drive element 131 changes. Specifically, the on-resistance of drive element 131 decreases. Thus, output voltage Vout is increased to and maintained at constant voltage value V2 (e.g., 13.6V), which is equal to or lower than rated voltage Vs. Note that constant voltage value V2 only needs to be equal to or lower than rated voltage Vs and higher than constant voltage value V1, and may be, for example, the same value as rated voltage Vs (14V).

This enables constant voltage control at a voltage not exceeding rated voltage Vs and allows backup power supply apparatus 100 to start supplying power to power-supply target apparatus 2.

Note that, in time T2, control circuitry 140 may change the on-resistance of switching element 150 by a method other than switching switching element 150 between the non-conductive state and the conductive state. When the on-resistance of switching element 150 changes, the combined resistance value of resistance element 135 and resistance element 136 changes and the division ratio of voltage divider 133 changes. As a result, the voltage inputted to the non-inverting input terminal of operational amplifier 160 changes.

After time T2, power storage voltage Vu gradually decreases as power is supplied to power-supply target apparatus 2. In addition, as power storage voltage Vu decreases, gate voltage Vg of drive element 131 also gradually decreases.

At time T3, power storage voltage Vu becomes rated voltage Vs. That is, output voltage Vout does not exceed rated voltage Vs even though power storage voltage Vu is outputted as output voltage Vout. At this time, control circuitry 140 controls switching element 170 to directly output power storage voltage Vu as output voltage Vout.

To be more specific, control circuitry 140 switches switching element 170 from the non-conductive state to the conductive state. This causes the gate of drive element 131 to be connected to the ground. That is, gate voltage Vg of drive element 131 becomes 0V. Thus, gate-source voltage Vgs of drive element 131 matches power storage voltage Vu.

Since the on-resistance of drive element 131 decreases as gate-source voltage Vgs increases, the on-resistance of drive element 131 becomes extremely small when gate voltage Vg of drive element 131 becomes 0V. That is, the current conducting between the source and drain of drive element 131 increases. Accordingly, power storage voltage Vu is directly outputted from series regulator 130 as output voltage Vout.

Figure 3:
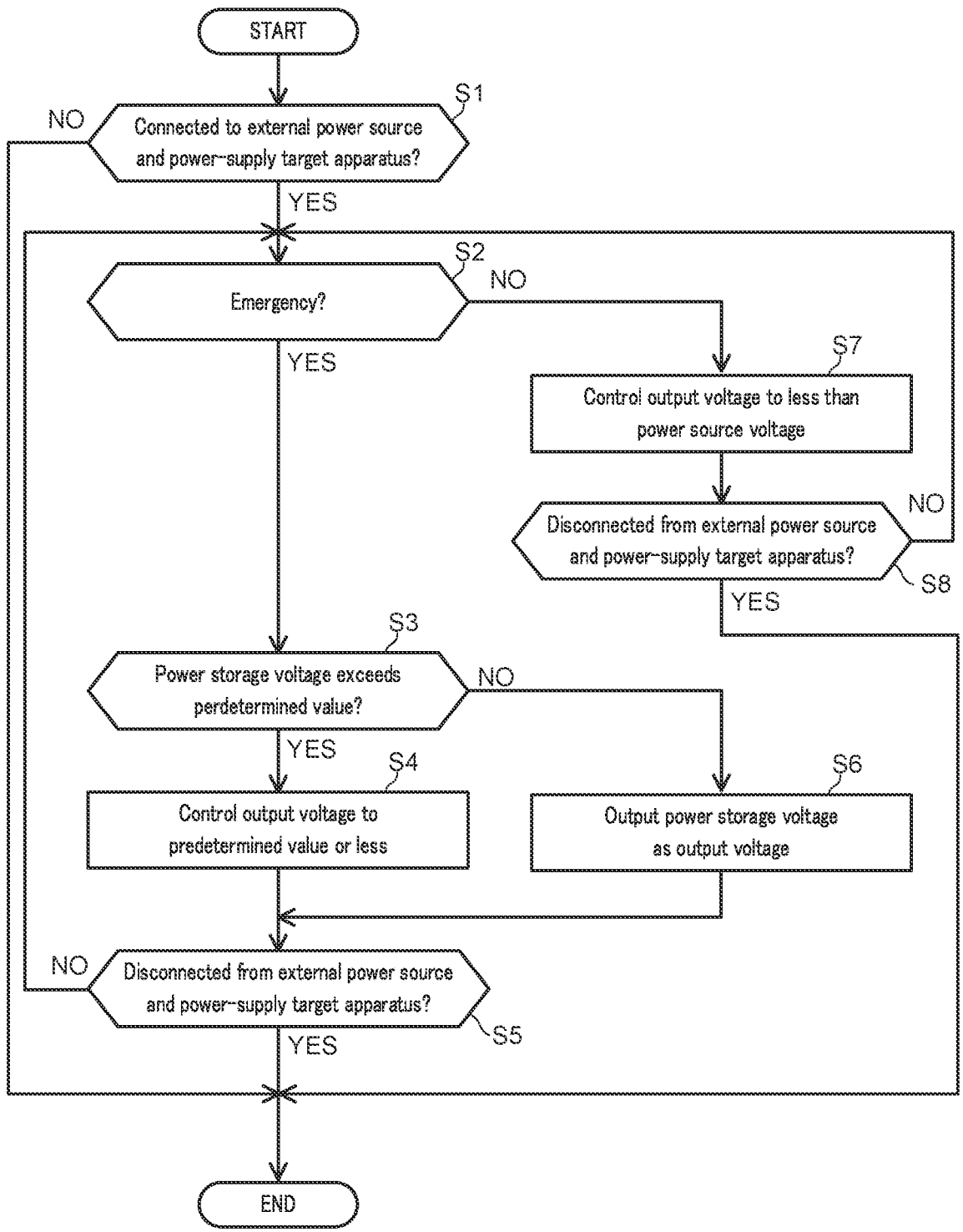
FIG. 3 is a flowchart describing an exemplary voltage control operation of the backup power supply apparatus according to an embodiment.

FIG. 3 is an exemplary flowchart describing the output voltage control operation of backup power supply apparatus 100.

First, in step S1, control circuitry 140 determines whether backup power supply apparatus 100 is connected to external power source 1 and power-supply target apparatus 2. When backup power supply apparatus 100 is not connected to external power source 1 and power-supply target apparatus 2 ("NO" in step S1), the output voltage control operation is terminated. When backup power supply apparatus 100 is connected to external power source 1 and power-supply target apparatus 2 ("YES" in step S1), the processing proceeds to step S2.

In step S2, control circuitry 140 determines whether the power supply state of external power source 1 is an emergency state based on a signal from current detection circuitry 120. For example, control circuitry 140 interprets the signal from current detection circuitry 120 as output current Iout and compares output current Iout with threshold Ith. Then, control circuitry 140 determines that the power supply state is normal when output current Iout is equal to or less than threshold Ith, and determines that the power supply state is emergency when output current Iout exceeds threshold Ith.

When the power supply state is normal ("NO" in step S2), the processing proceeds to step S7 and control circuitry 140 controls output voltage Vout to less than power source voltage Vd. To be more specific, control circuitry 140 places switching element 150 in the non-conductive state. More specifically, control circuitry 140 switches switching element 150 to the non-conductive state when it is originally in the conductive state and maintains the non-conductive state when switching element 150 is originally in the non-conductive state. Thus, a voltage based on the division ratio between the combined resistance value when switching element 150 is in the non-conductive state and resistance element 134 is inputted to the non-inverting input terminal of operational amplifier 160. Operational amplifier 160 outputs a voltage based on a difference between the voltage based on the division ratio and a reference voltage. The voltage is inputted to the gate of drive element 131 through resistance element 184. The on-resistance of drive element 131 is determined based on the voltage inputted to the gate; accordingly, the output voltage of series regulator 130 is determined. For example, the output voltage is controlled to constant voltage value V1 (time prior to time T1 in FIG. 2).

Note that, when the power supply state is normal ("NO" in step S2), control circuitry 140 always places switching element 170 in the non-conductive state. Control circuitry 140, however, may switch switching element 170 from the non-conductive state to the conductive state and connect the gate of drive element 131 to the ground only when detecting that the power supply state is normal and power storage voltage Vu is less than power source voltage Vd. That is, control circuitry 140 may output power storage voltage Vu as output voltage Vout.

After that, in step S8, control circuitry 140 determines whether backup power supply apparatus 100 is disconnected from external power source 1 and power-supply target apparatus 2. When backup power supply apparatus 100 is disconnected from external power source 1 and power-supply target apparatus 2 ("YES" in step S8), the output voltage control operation is terminated. When backup power supply apparatus 100 is connected to external power source 1 and power-supply target apparatus 2 ("NO" in step S8), the processing proceeds to step S2.

When the power supply state is emergency ("YES" in step S2), control circuitry 140 determines whether power storage voltage Vu exceeds a predetermined value in step S3. The predetermined value here is rated voltage Vs of power-supply target apparatus 2.

When power storage voltage Vu exceeds the predetermined value ("YES" in step S3), the processing proceeds to step S4, and control circuitry 140 performs constant voltage control on output voltage Vout so as to be constant voltage value V2, which is equal to or lower than the predetermined value. To be more specific, control circuitry 140 changes switching element 150 from the non-conductive state to the conductive state, and changes the combined resistance value (control at time T2 in FIG. 2). When switching element 150 is originally in the conductive state, control circuitry 140 maintains the conductive state.

Next, in step S5, control circuitry 140 determines whether backup power supply apparatus 100 is disconnected from external power source 1 and power-supply target apparatus 2. When backup power supply apparatus 100 is disconnected from external power source 1 and power-supply target apparatus 2 ("YES" in step S5), the output voltage control operation is terminated. When backup power supply apparatus 100 is connected to external power source 1 and power-supply target apparatus 2 ("NO" in step S5), the processing proceeds to step S2.

When power storage voltage Vu does not exceed the predetermined value ("NO" in step S3), the processing proceeds to step S6, and control circuitry 140 outputs power storage voltage Vu as output voltage Vout.

In step S6, control circuitry 140 switches switching element 170 from the non-conductive state to the conductive state, and connects the gate of drive element 131 to the ground (similar to control at time T3 in FIG. 2). After that, the process of step S5 is performed. When switching element 170 is originally in the conductive state, control circuitry 140 maintains the conductive state.

As described above, backup power supply apparatus 100 according to the present embodiment includes: power storage section 110; series regulator 130 that is located on power supply line PL connecting power storage section 110 and power-supply target apparatus 2; and control circuitry 140 that changes output voltage Vout of series regulator 130 in multiple stages in accordance with the change in the power supply state of external power source 1 and the change in power storage voltage Vu.

The method of controlling backup power supply apparatus 100 according to the present embodiment includes changing, in multiple stages, output voltage Vout of series regulator 130 on power supply line PL that connects power storage section 110 and power-supply target apparatus 2, in accordance with the change in the power supply state of external power source 1 and the change in power storage voltage Vu.

According to the present embodiment, series regulator 130 is located on power supply line PL, and changing the output voltage of series regulator 130 in multiple stages enables adaptive step-down of power storage voltage Vu according to various circumstances. In addition, since the present embodiment does not adopt a configuration in which a large number of diodes are connected in series for the step-down of power storage voltage Vu, it is possible to prevent a significant increase in the number of components necessary for the step-down of power storage voltage Vu and also prevent power loss, an increase in the size of the apparatus, etc.

Series regulator 130 includes drive element 131 located on power supply line PL. Then, control circuitry 140 controls drive element 131 to output a first constant voltage (constant voltage value V1) that is lower than power source voltage Vd in a normal state, output a second constant voltage (constant voltage value V2) that is equal to or lower than a predetermined value (rated voltage Vs of external power source 1) and higher than constant voltage value V1 when power storage voltage Vu exceeds the predetermined value in an emergency state, and output power storage voltage Vu when power storage voltage Vu does not exceed rated voltage Vs in the emergency state.

According to the present embodiment, only placing drive element 131 on power supply line PL enables multiple-stage control of output voltage Vout according to various circumstances.

For example, even when backup power supply apparatus 100 has a relatively large battery capacity and the difference between rated voltage Vs and power storage voltage Vu is relatively large, it is possible, with a small number of components, to prevent deterioration of a storage battery by reducing the frequency of the use of the storage battery in the case of non-power outage, and control the output voltage so as to reduce the load on power-supply target apparatus 2 in the case of an emergency.

Series regulator 130 includes: a transistor (drive element 131) located on power supply line PL; and gate voltage adjustment circuitry 132 that changes the gate voltage of the transistor (drive element 131) in multiple stages in accordance with the change in the power supply state of external power source 1 and the change in the power storage voltage.

That is, by locating the transistor, which is a simple and inexpensive element, on power supply line PL and changing the gate voltage in accordance with the change in the power supply state and the change in the power storage voltage, output voltage Vout can be controlled in multiple stages according to various circumstances.

The larger the number of components, e.g., diodes and transistors for step-down of the power storage voltage, located on power supply line PL, the greater the power loss of the backup power supply apparatus during power supply. According to the present embodiment, only placing a transistor on power supply line PL and controlling the gate voltage enables multiple-stage control of output voltage Vout, thereby reducing the power loss of backup power supply apparatus 100 during power supply. In addition, the increased number of diodes and transistors for the step-down of the power storage voltage possibly results in an increase in the size of the backup power supply apparatus, but the present embodiment has no such possibility.

Gate voltage adjustment circuitry 132 includes: operational amplifier 160 that is connected to the gate of the transistor (drive element 131) on the output side and controls gate voltage Vg; and voltage divider 133 that divides output voltage Vout and inputs the divided voltage to operational amplifier 160. Control circuitry 140 changes the division ratio of voltage divider 133 in accordance with the change in the power supply state of external power source 1.

Thus, it is possible to perform control in an analog way of maintaining output voltage Vout at power source voltage Vd or lower in the normal state and maintaining output voltage Vout at rated voltage Vs of power-supply target apparatus 2 or lower in the emergency state.

To be more specific, voltage divider 133 includes a pair of resistance elements 134 and 135 that are connected in series with each other and have operational amplifier 160 connected at the intermediate portion, and resistance element 136 connected in parallel with resistance element 135. In addition, gate voltage adjustment circuitry 132 includes switching element 150 that switches the state of connection between resistance element 136 and the ground between the conductive state and the non-conductive state and changes the combined resistance value of resistance element 135 and resistance element 136. Further, control circuitry 140 controls switching element 150 so that the state of connection between resistance element 136 and the ground is the non-conductive state in the normal state and the conductive state in the emergency state.

That is, simple control of switching switching element 150 between the conductive state and the non-conductive state changes the gate voltage of the transistor (drive element 131), thereby changing output voltage Vout in multiple stages.

Backup power supply apparatus 100 includes current detection circuitry 120 that detects an output current using resistance element 121 located on power supply line PL. In addition, control circuitry 140 determines whether the power supply state of external power source 1 is normal or emergency based on the detection result of current detection circuitry 120.

It is thus possible to detect the change in the power supply state of external power source 1 with a simple and inexpensive circuitry configuration.

Gate voltage adjustment circuitry 132 includes switching element 170 that switches the state of connection between the gate of the transistor (drive element 131) and the ground between the conductive state and the non-conductive state and changes the on-resistance of the transistor (drive element 131). Control circuitry 140 also controls switching element 170 to set the state of connection between the gate and the ground to the non-conductive state in the normal state and to either the non-conductive state or the conductive state depending on power storage voltage Vu in the emergency state.

When switching element 170 is in the conductive state, the gate of the transistor (drive element 131) is connected to the ground, so that the gate-source voltage can be extremely high. This makes the on-resistance of the transistor (drive element 131) extremely small, and thus the power loss in the transistor (drive element 131) can be reduced as much as possible during power supply from backup power supply apparatus 100 to power-supply target apparatus 2.

The transistor (drive element 131) is a p-type field effect transistor. Control circuitry 140 sets the state of connection between the gate and the ground to the conductive state when power storage voltage Vu does not exceed a predetermined value (rated voltage Vs) in the emergency state.

Thus, the power loss in the transistor (drive element 131) during power supply by backup power supply apparatus 100 can be reduced as much as possible by a simple circuitry configuration compared with a case of using an n-type field effect transistor as the transistor (drive element 131).
(Variation 1)

Figure 4:
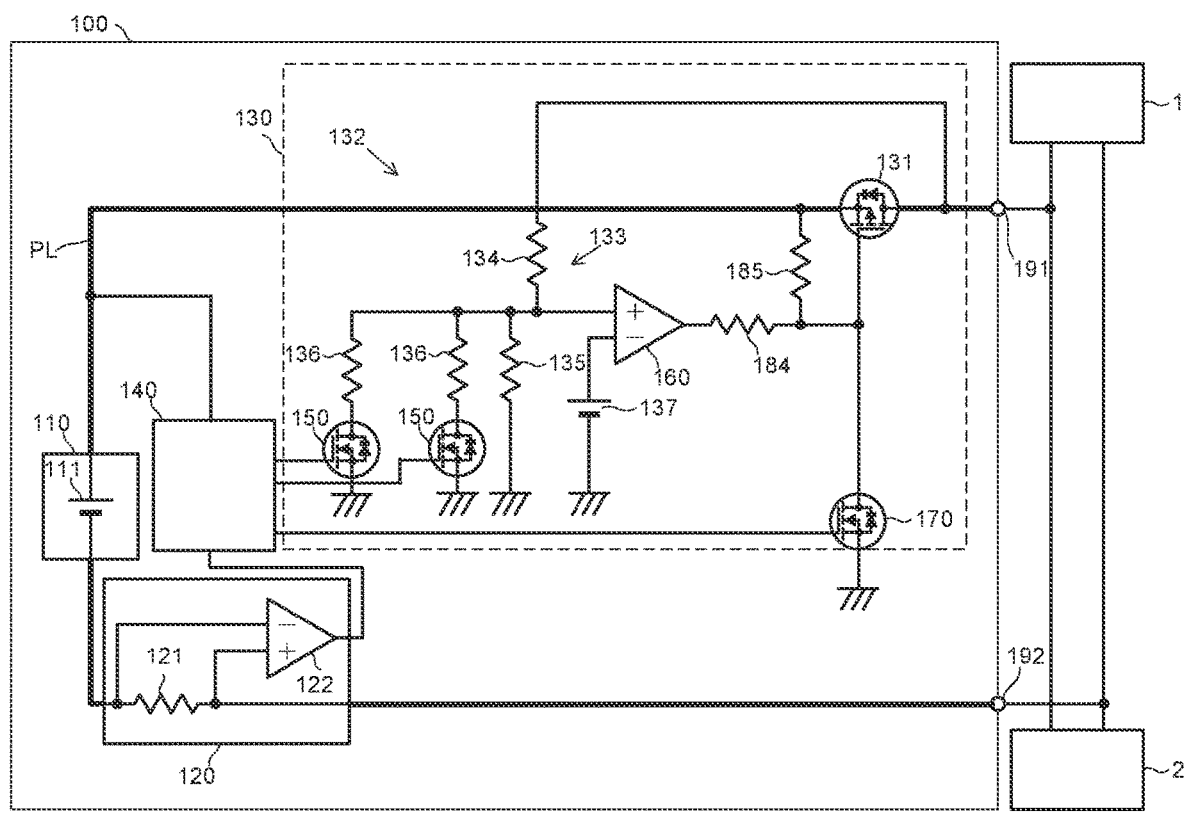
FIG. 4 is a circuit diagram illustrating the backup power supply apparatus according to Variation 1.

Variation 1 will be described below mainly about a difference from the embodiment. FIG. 4 is a circuit diagram illustrating backup power supply apparatus 100 according to Variation 1.

As illustrated in FIG. 4, voltage divider 133 includes a plurality of sets of resistance element 136 and switching element 150, which are connected in parallel between the non-inverting input terminal of operational amplifier 160 and the ground. Thus, the second resistor section is composed of resistance element 135 and the plurality of resistance elements 136 in Variation 1. Note that, although FIG. 4 illustrates two sets of resistance element 136 and switching element 150 provided in voltage divider 133, three or more sets may be provided.

According to Variation 1, control circuitry 140 can set a larger number of values as the combined resistance value of resistance element 135 and the plurality of resistance elements 136 by individually controlling the switching of the plurality of switching elements 150 between the conductive state and the non-conductive state. Accordingly, a larger number of values can be set as the division ratio in voltage divider 133.
(Variation 2)

Figure 5:
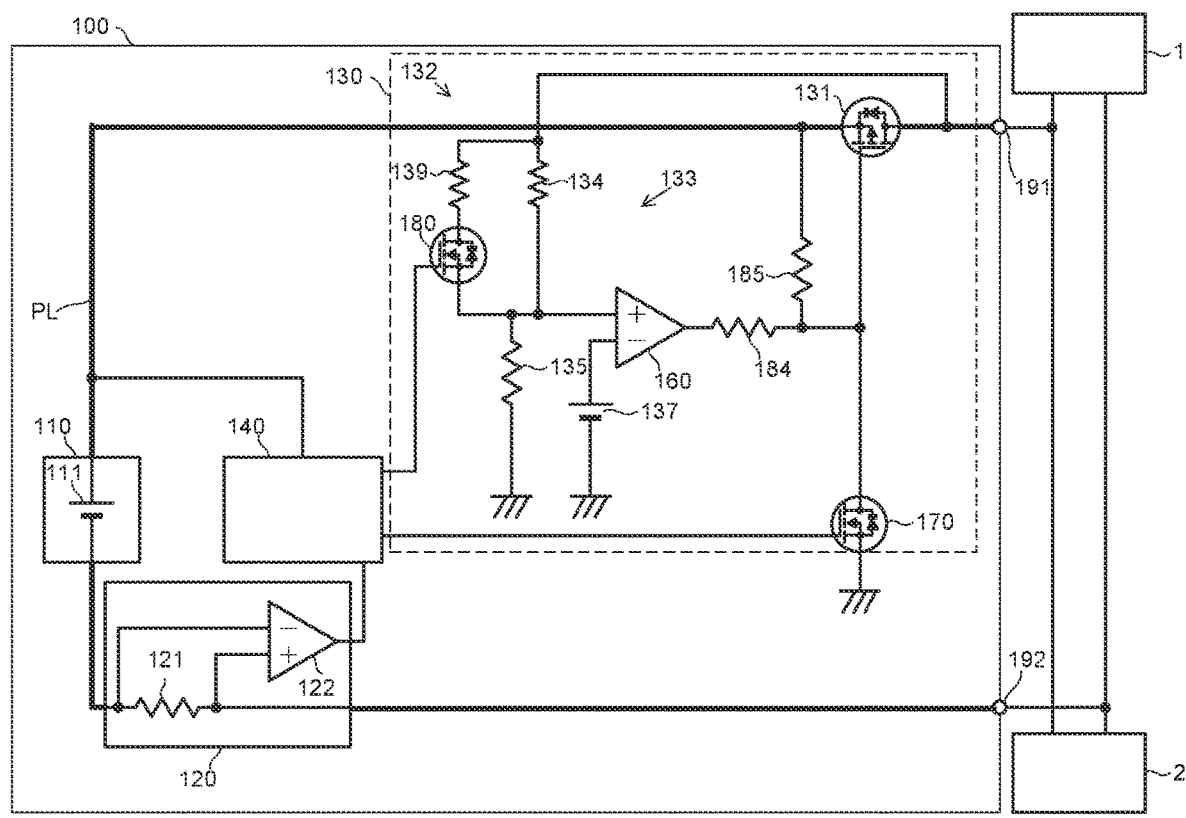
FIG. 5 is a circuit diagram illustrating the backup power supply apparatus according to Variation 2.

Variation 2 will be described below mainly about a difference from the embodiment. FIG. 5 is a circuit diagram illustrating backup power supply apparatus 100 according to Variation 2.

As illustrated in FIG. 5, voltage divider 133 may include resistance element 139 and switching element 180 connected in parallel with resistance element 134 instead of resistance element 136 and switching element 150. Switching element 180 is a field effect transistor or the like. Thus, the first resistor section is composed of resistance element 134 and resistance element 139 in Variation 2.

In Variation 2, control circuitry 140 controls switching element 180 to be in the conductive state in the normal state and the non-conductive state in the emergency state. This changes the combined resistance value of resistance element 134 and resistance element 139 on the feedback line, thereby changing the division ratio of voltage divider 133.
(Other Variations)

In the embodiment and variations described above, resistance element 121 is used to detect the output current, but a hall element may be used for the detection. The use of the hall element reduces the temperature rise of backup power supply apparatus 100 because the hall element generates less heat than resistance element 121.

In the embodiment and variations described above, threshold Ith is used to determine the power supply state. Threshold Ith may be set to a micro-value. That is, control circuitry 140 may determine that external power source 1 is in the emergency state, i.e., the power outage state, when output current Iout flows even slightly. In addition, control circuitry 140 may change threshold Ith according to a user's setting.

Further, control circuitry 140 may determine that external power source 1 is in the power outage state when receiving a signal indicating a power outage from a predetermined communication apparatus.

In addition to the switching control between the non-conductive state and the conductive state of switching element 150, control circuitry 140 may receive a setting of voltage Vd of external power source 1 and rated voltage Vs of power-supply target apparatus 2 and determine the above-described voltage values V1 and V2 based on the received contents. That is, a target value of the output voltage Vout in the normal state (above-described voltage value V1) and a target value of output voltage Vout in the emergency state (above-described voltage value V2) may be determined according to voltage Vd of external power source 1 connected to backup power supply apparatus 100 and rated voltage Vs of power-supply target apparatus 2.

At this time, resistance element 136 may be a variable resistance element. In addition, control circuitry 140 may change the above-described voltage values V1 and V2 according to power source voltage Vd and rated voltage Vs of power-supply target apparatus 2 by controlling a resistance value of the variable resistance.

Drive element 131 may also be a variable resistance element. Further, drive element 131 may be an n-type field effect transistor. In a case of the n-type field effect transistor, gate voltage adjustment circuitry 132 is configured to apply a gate voltage of higher potential than the source voltage of drive element 131. Meanwhile, in a case of a p-type field effect transistor, the on-resistance can be reduced by reducing the gate voltage relative to the source voltage and increasing the gate-source voltage. Here, a configuration for reducing the gate voltage is easily realized by a relatively simple circuitry configuration compared to a configuration for increasing the gate voltage. In particular, the present embodiment includes a case where power storage voltage Vu is outputted as output voltage Vout without being stepped down. At this time, the gate voltage can be easily minimized simply by grounding the gate. In this respect, the configuration as in the present embodiment is advantageous in which a p-type field effect transistor is adopted as drive element 131 located on power supply line PL.

INDUSTRIAL APPLICABILITY

The present disclosure is suitably utilized for a backup power supply apparatus and a method of controlling the backup power supply apparatus that supplies power to a power-supply target apparatus operating by power supply from an external power source when a power supply state of the external power source is emergency.

REFERENCE SIGNS LIST

1 External power source
2 Power-supply target apparatus
100 Backup power supply apparatus 110 Power storage section
111 Storage battery
120 Current detection circuitry
121 Resistance element
122 Operational amplifier
130 Series regulator
131 Drive element
132 Gate voltage adjustment circuitry
133 Voltage divider
134 to 136, 139 Resistance element
137 Reference power supply
140 Control circuitry
150, 170, 180 Switching element
160 Operational amplifier
184, 185 Resistance element
191, 192 Input/output terminal
PL Power supply line

What is claimed is:

1. A backup power supply apparatus configured to supply power to a power-supply target apparatus when a power supply state of an external power source is emergency, the power-supply target apparatus being an apparatus configured to operate by power supply from the external power source, the backup power supply apparatus comprising:
   a power storage section;
   a series regulator that is located on a line connecting the power storage section and the power-supply target apparatus; and
   control circuitry configured to change an output voltage of the series regulator in multiple stages in accordance with a change in the power supply state of the external power source and a change in a voltage of the power storage section, wherein:
      the series regulator comprises: a p-type field effect transistor disposed on the line; and gate voltage adjustment circuitry configured to decrease a gate voltage of the p-type field effect transistor stepwise under control of the control circuitry, and
      the gate voltage adjustment circuitry is configured to perform a first step of the stepwise decrease of the gate voltage in an emergency state, and perform a second step of the stepwise decrease of the gate voltage when a voltage of the power storage section decreases and becomes a rated voltage of the power-supply target apparatus.

2. The backup power supply apparatus according to claim 1, wherein the control circuitry is configured to control the p-type field effect transistor to:
   output a first constant voltage that is lower than a voltage of the external power source in a normal state which is before performance of the first step,
   output a second constant voltage that is equal to or lower than the rated voltage and higher than the first constant voltage after performance of the first step and before performance of the second step, and
   output the voltage of the power storage section after performance of the second step.

3. The backup power supply apparatus according to claim 1, wherein the gate voltage adjustment circuitry comprises:
   an operational amplifier that is connected to a gate of the p-type field effect transistor on an output side and configured to control the gate voltage; and
   a voltage divider configured to device the output voltage and input the divided voltage to the operational amplifier,
   wherein the control circuitry is configured to change a division ratio of the voltage divider in accordance with the change in the power supply state of the external power source.

4. The backup power supply apparatus according to claim 3, wherein:
   the voltage divider comprises a first resistor section and a second resistor section that are connected in series with each other and have the operational amplifier connected at an intermediate portion,
   at least one of the first resistor section and the second resistor section comprises a plurality of resistance elements and a switching element for voltage division resistance control, and
   the control circuitry is configured to control the switching element for voltage division resistance control based on whether the power supply state of the external power source is normal or emergency, and change a combined resistance value of the plurality of resistance elements.

5. The backup power supply apparatus according to claim 4, wherein:
   the backup power supply apparatus further comprises current detection circuitry configured to detect an output current using an element located on the line, and
   the control circuitry is configured to determine whether the power supply state of the external power source is normal or emergency based on a detection result of the current detection circuitry.

6. The backup power supply apparatus according to claim 1, wherein:
   the gate voltage adjustment circuitry comprises a switching element for on-resistance control configured to switch a state of connection between a gate of the p-type field effect transistor and the ground between a conductive state and a non-conductive state and change on-resistance of the p-type field effect transistor, and
   the control circuitry is configured to control the switching element for on-resistance control to set the state of connection between the gate and the ground to the non-conductive state in a normal state and to either the non-conductive state or the conductive state depending on the voltage of the power storage section in an emergency state.

7. The backup power supply apparatus according to claim 6, wherein,
   the control circuitry is configured to set the state of connection between the gate and the ground to the conductive state when the voltage of the power storage section does not exceed the rated voltage in the emergency state.

* * * * *